(12) United States Patent
Sugiyama et al.

(10) Patent No.: US 11,370,417 B2
(45) Date of Patent: Jun. 28, 2022

(54) REMOTE PARKING DEVICE AND REMOTE PARKING METHOD

(71) Applicant: Mitsubishi Electric Corporation, Tokyo (JP)

(72) Inventors: Akinobu Sugiyama, Tokyo (JP); Atsushi Yoshikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 16/913,089

(22) Filed: Jun. 26, 2020

(65) Prior Publication Data

US 2021/0053555 A1 Feb. 25, 2021

(30) Foreign Application Priority Data

Aug. 23, 2019 (JP) .............................. JP2019-152444

(51) Int. Cl.
*B60W 30/06* (2006.01)
*H04W 4/40* (2018.01)
*G05D 1/00* (2006.01)

(52) U.S. Cl.
CPC .......... *B60W 30/06* (2013.01); *G05D 1/0022* (2013.01); *H04W 4/40* (2018.02)

(58) Field of Classification Search
CPC combination set(s) only.
See application file for complete search history.

(56) References Cited

U.S. PATENT DOCUMENTS

2017/0038777 A1* 2/2017 Harvey ................. G05D 1/0027
2019/0066401 A1* 2/2019 Seaman ................. G08G 1/205

FOREIGN PATENT DOCUMENTS

| JP | 11-341632 A | 12/1999 |
| JP | 2003-259467 A | 9/2003 |
| JP | 2013-9033 A | 1/2013 |
| JP | 2018-172061 A | 11/2018 |
| JP | 2019-29691 A | 2/2019 |

OTHER PUBLICATIONS

Written Notice of reasons for Refusal dated Oct. 20, 2020 from the Japanese Patent Office in Application No. 2019-152444.

* cited by examiner

*Primary Examiner* — Thomas S McCormack
(74) *Attorney, Agent, or Firm* — Sughrue Mion, PLLC; Richard C. Turner

(57) ABSTRACT

In a remote parking device, a remote control receiver receives remote operation signals including remote parking commands of a subject vehicle from a plurality of remote controllers. A sensor information receiver receives sensor information including surrounding information obtained in a surrounding information sensor in the subject vehicle and vehicle information obtained in a vehicle information sensor in the subject vehicle. When the plurality of remote operation signals including the remote parking commands are received at the same time, a priority determination part determines priority of each of the plurality of remote parking commands included in the plurality of remote operation signals based on information obtained from the plurality of remote operation signals. A remote parking controller controls a remote parking of the subject vehicle based on the remote parking command having highest priority and the sensor information.

17 Claims, 8 Drawing Sheets

FIG. 4

| EVALUATION ITEM | EVALUATION SCORE | | |
|---|---|---|---|
| CONTENT OF REMOTE PARKING COMMAND ($w_1$) | PARKING SUSPEND : 20 | UNLOADING : 10 | LOADING : 1 |
| TYPE OF REMOTE CONTROLLER ($w_2$) | SMARTPHONE : 5 | ELECTRONIC KEY : 3 | |
| DISTANCE FROM VEHICLE TO REMOTE CONTROLLER ($w_3$) | SMALL DISTANCE : 5 | MIDDLE DISTANCE : 3 | LARGE DISTANCE : 1 |
| DIRECTION OF REMOTE CONTROLLER FROM VEHICLE ($w_4$) | FRONT SIDE : 5 | LATERAL SIDE : 3 | REAR SIDE : 1 |
| RECEPTION INTENSITY OF REMOTE OPERATION SIGNAL ($w_5$) | STRONG : 3 | MIDDLE : 2 | WEAK : 1 |

F I G. 8
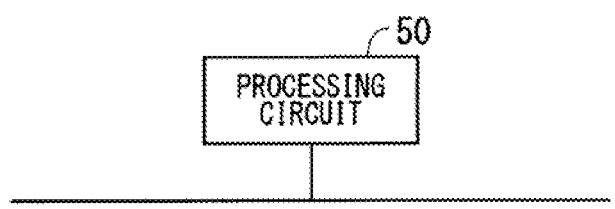
F I G. 9
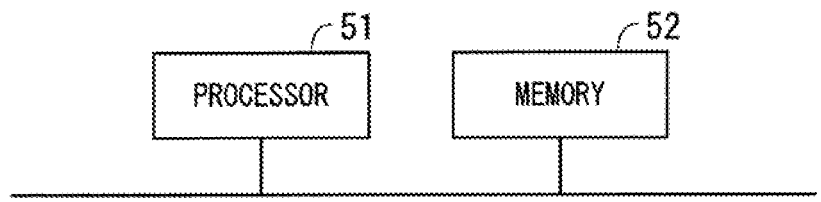

REMOTE PARKING DEVICE AND REMOTE PARKING METHOD

BACKGROUND OF THE INVENTION

Field of the Invention

The present invention relates to a remote parking device parking a vehicle in accordance with a remote operation using a remote controller.

Description of the Background Art

Recently, a vehicle performing a self-parking in accordance with a remote operation using a remote controller is put into practical use. Japanese Patent Application Laid-Open No. 2018-172061 proposes a remote parking system detecting a person's behavior (for example, contact and proximity) on a vehicle to suspend a remote control so as to be able to immediately suspend the remote control of the vehicle when a defect occurs in a remote controller operating the vehicle remotely.

In the meanwhile, Japanese Patent Application Laid-Open No. 11-341632 discloses a technique, in a remote operation control device of a maintenance vehicle to which two remote controllers are connected, capable of continuing a remote operation using the other remote controller when the remote operation of the maintenance vehicle cannot be controlled by one remote controller.

SUMMARY

When there are a plurality of remote controllers of a remote parking device performing a remote parking of a vehicle, there is a possibility that the remote parking device receives remote parking commands having different contents from the plurality of remote controllers at the same time. Thus, the remote parking device can preferably select an appropriate remote parking command automatically from the plurality of remote parking commands which have been received at the same time. Japanese Patent Application Laid-Open Nos. 2018-172061 and 11-341632 do not consider a response to a case where the remote parking commands are received from the plurality of remote controller at the same time.

An object of the present invention is to provide a remote parking device automatically selecting a remote parking command having higher priority when receiving remote parking commands from a plurality of remote controllers at the same time.

A remote parking device according to the present invention includes: a remote control receiver receiving at least one remote operation signal including at least one remote parking command of a subject vehicle from a plurality of remote controllers; a sensor information receiver receiving sensor information including surrounding information obtained in a surrounding information sensor in the subject vehicle and vehicle information obtained in a vehicle information sensor in the subject vehicle; a remote parking controller controlling a remote parking of the subject vehicle based on the remote parking command and the sensor information; and a priority determination part determining, when the plurality of remote operation signals including the remote parking commands are simultaneously received, priority of each of the plurality of remote parking commands included in the plurality of remote operation signals based on information obtained from the plurality of remote operation signals. When the plurality of remote operation signals including the remote parking commands are simultaneously received, the remote parking controller controls the remote parking of the subject vehicle based on the remote parking command having highest priority in the plurality of remote parking commands included in the plurality of remote operation signals and the sensor information.

According to the remote parking device in the present invention, when the plurality of remote operation signals including the remote parking commands are received at the same time, the priority of each of the plurality of remote parking commands included in the plurality of remote operation signals is determined, and the remote parking of the subject vehicle is controlled based on the remote parking command having the highest priority. Thus, safety and reliability of the remote parking can be ensured even when the remote parking device receives the remote parking command from the plurality of remote controller at the same time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a drawing explaining an evaluation table according to the embodiment 1 of the present invention.

FIG. 8 is a drawing illustrating an example of a hardware configuration of the remote parking device.

FIG. 9 is a drawing illustrating an example of a hardware configuration of the remote parking device.

DESCRIPTION OF THE PREFERRED EMBODIMENTS

Embodiment 1

Figure 1:
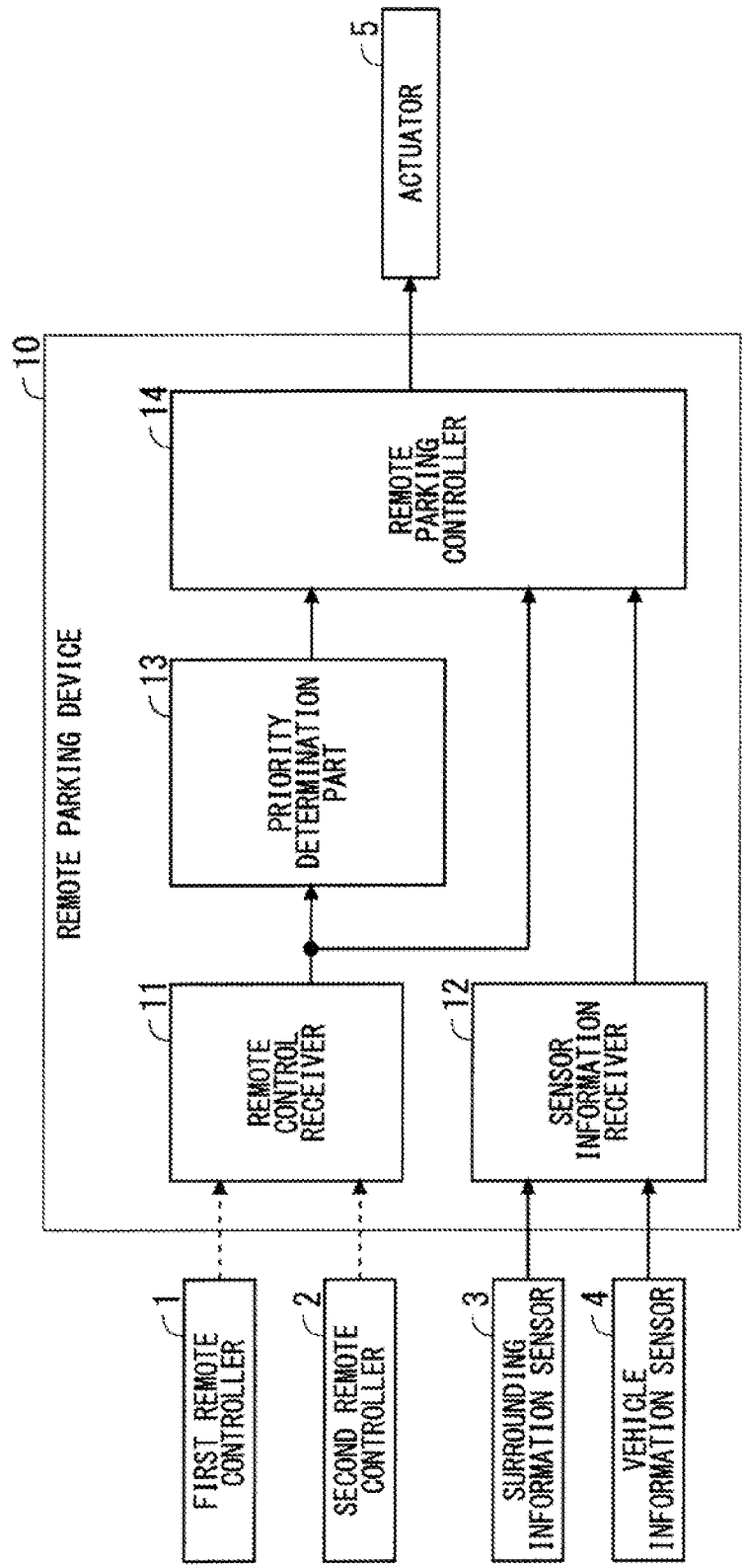
FIG. 1 is a block diagram illustrating a configuration of a remote parking device according to an embodiment 1 of the present invention.

FIG. 1 is a block diagram illustrating a configuration of a remote parking device 10 according to an embodiment 1 of the present invention. Herein, the remote parking device 10 is mounted on a vehicle, and the vehicle on which the remote parking device 10 is mounted is referred to as "the subject vehicle" hereinafter.

The remote parking device 10 receives remote operations from a plurality of remote controllers. It is assumed in the present embodiment that the remote parking device 10 can be operated remotely by two remote controllers of a first remote controller 1 and a second remote controller 2. However, there may be three or more remote controllers which can remotely operate the remote parking device 10.

The first remote controller 1 and the second remote controller 2 are terminals each operated by a user of a subject vehicle. The first remote controller 1 and the second remote controller 2 transmit a remote operation signal, which includes a remote parking command to the subject vehicle, to the remote parking device 10 in accordance with an operation performed by the user from outside of the subject vehicle. The first remote controller 1 and the second remote controller 2 need not be the remote controllers specifically for the remote parking device 10, thus there is no restriction on a type thereof. For example, the first remote controller 1 and the second remote controller 2 may be electronic keys each having a communication function such as a smart key (registered trademark) of the subject vehicle or general-purpose communication terminals such as smartphones, tablet terminals, and feature phones. A remote operation signal transmitted from the first remote controller 1 and the second remote controller 2 may include information indicating a type of a remote controller transmitting the signal.

The remote parking command transmitted from the first remote controller 1 and the second remote controller 2 generally includes a parking start command and a parking suspend command, and the remote parking device 10 performs a parking control of the subject vehicle from when receiving the parking start command until when receiving the parking suspend command. Alternatively, it is also applicable that each of the first remote controller 1 and the second remote controller 2 continuously transmits the parking start command while its operation button is pressed and the remote parking device 10 performs the parking control of the subject vehicle while receiving the parking start command. That is to say, an end of transmission of parking start command may serve as the parking suspend command.

The remote parking command may include a command to switch to a low speed mode or a command to move in centimeters so to be able to achieve a fine adjustment of a parking position of the subject vehicle. Furthermore, the remote parking command may include a command to select a parking space (a parking place) for parking the subject vehicle or a command to select a parking method (a parallel parking and a double parking) of the subject vehicle. The remote parking command may include not only a loading command to instruct the subject vehicle to enter the parking space but also an unloading command to instruct the subject vehicle to get out of the parking space.

As illustrated in FIG. 1, the remote parking device 10 is connected to a surrounding information sensor 3, a vehicle information sensor 4, and an actuator 5 each mounted on the subject vehicle.

The surrounding information sensor 3 is a sensor obtaining surrounding information which is information indicating an environment around the subject vehicle, and is made up of a sonar sensor, a perimeter monitoring camera, a millimeter wave radar, and a light detection and ranging (LIDAR), for example. The surrounding information sensor 3 may be made up of a plurality of sensors. Considered as the surrounding information obtained in the surrounding information sensor 3 is a presence or absence of a target around the subject vehicle, a position (a distance and a direction) and a speed of the target relative to the subject vehicle, a type of the target (a vehicle, a bicycle, or a pedestrian, for example), and information of white line painted on a road surface (white line information), for example. The surrounding information may include information of reliability of a sensor obtaining the surrounding information.

The vehicle information sensor 4 is a sensor obtaining vehicle information which is information indicating a state of the subject vehicle, and is a wheel speed sensor, a yaw rate sensor, and a steering angle sensor, for example. Also the vehicle information sensor 4 may be made up of a plurality of sensors. There is no limitation on a type of the vehicle information sensor 4, thus also applicable is a sensor detecting a shift position, a rotation number of engine, and a relative angle of an electronic power steering, for example.

The surrounding information obtained in the surrounding information sensor 3 and the vehicle information obtained in the vehicle information sensor 4 are transmitted to the remote parking device 10. This communication system may be an optional system such as controller area network (CAN), CAN with flexible data rate (CAN-FD), Ethernet (registered trademark), and local interconnect network (LIN), for example. When the system having a small transmission data amount such as CAN (a data amount per ID of CAN is 8 byte) is used, the surrounding information sensor 3 may divide data of one target into plural pieces of data each having a different ID and transmit the data. Alternatively, the surrounding information sensor 3 may assign one ID to the plural pieces of data which have been divided and obtained and transmit it such as transport protocol (CAN TP). The ID and a transmission cycle of the data transmitted from the surrounding information sensor 3 and the vehicle information sensor 4 are defined in a preliminary design.

The actuator 5 is a drive device of the subject vehicle such as a brake, an engine, and an electronic power steering, for example. The remote parking device 10 controls the actuator 5, thereby performing a self-parking of the subject vehicle.

The remote parking device 10 performs the self-parking (the remote parking) of the subject vehicle in accordance with the remote operation from the first remote controller 1 and the second remote controller 2. Particularly, when the remote parking device 10 of the present embodiment receives the remote operation signal including the remote parking command from the first remote controller 1 and the second remote controller 2 at the same time, the remote parking device 10 determines the priority of the remote parking command thereof from a viewpoint of safety or reliability, and performs the remote parking of the subject vehicle in accordance with the remote parking command having higher priority. The state where "the remote operation signal is received at the same time" indicates not only a state where the remote operation signals are received at the same timing but also a state where the remote operation signal including the other remote parking command is received in a period in which the subject vehicle is controlled in accordance with one remote parking command.

As illustrated in FIG. 1, the remote parking device 10 includes a remote control receiver 11, a sensor information receiver 12, a priority determination part 13, and a remote parking controller 14.

The remote control receiver 11 receives the remote operation signal including the remote parking command of the subject vehicle from the plurality of remote controllers. Herein, the remote control receiver 11 receives the remote operation signal from each of the first remote controller 1 and the second remote controller 2. A communication system between the first remote controller 1 and the remote control receiver 11 and between the second remote controller 2 and the remote control receiver 11 needs to be a wireless communication, and applicable is any system such as Bluetooth (registered trademark), Wi-Fi, low frequency (LF) band communication, high frequency (HF) band communication, ultra high frequency (UHF) band communication, microwave band communication, ultra wide band (UWB), and optical communication.

The remote control receiver 11 can obtain not only the remote parking command from the remote operation signal received from the first remote controller 1 and the second remote controller 2 but also information of a type of a remote controller which has transmitted the remote operation signal, information of a relative position of the remote controller which has transmitted the remote operation signal, and information of reception intensity of the remote operation signal, for example.

Figure 2:
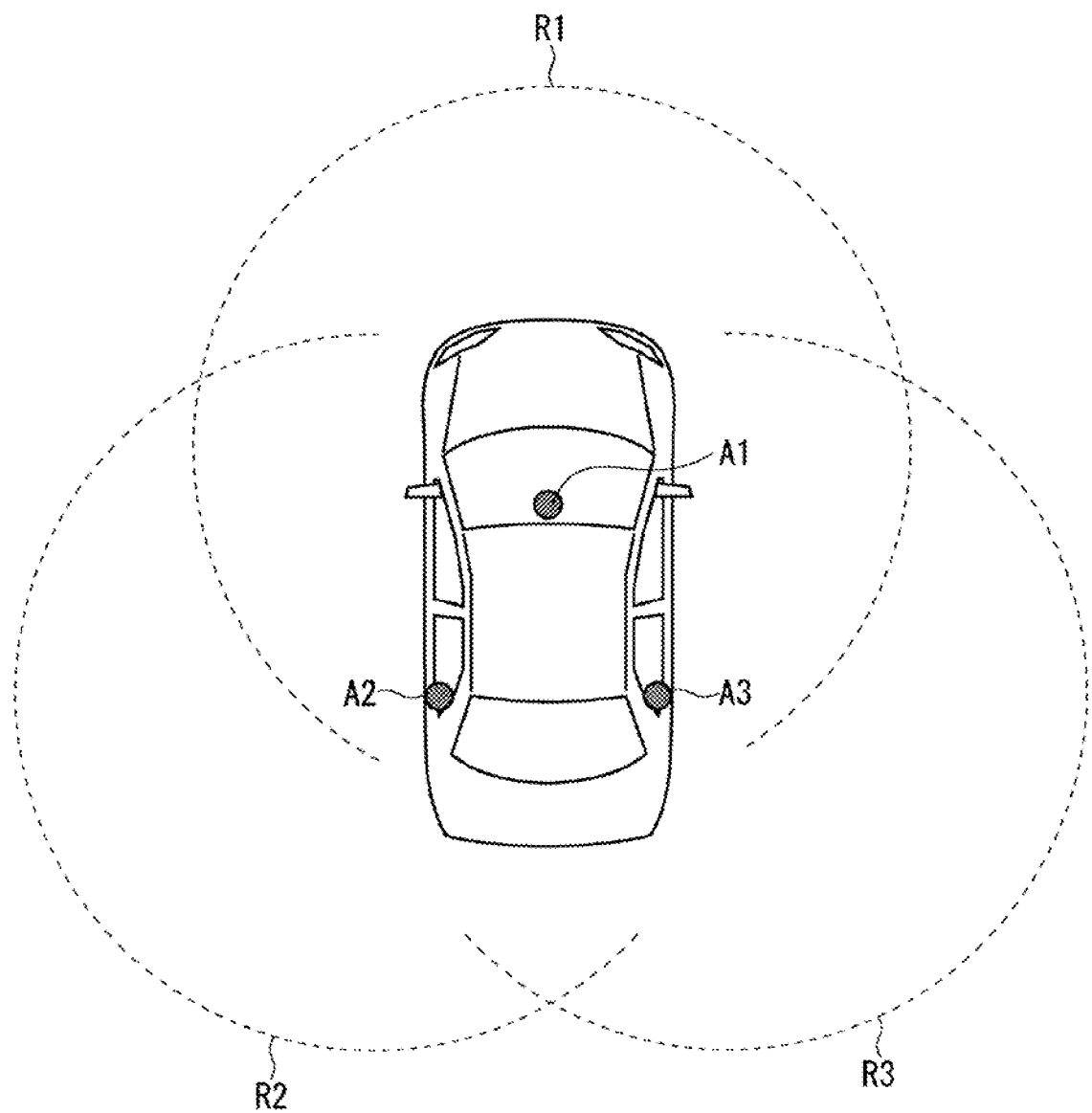
FIG. 2 is a drawing illustrating an example of a location of an antenna of the remote parking device.
Figure 3:
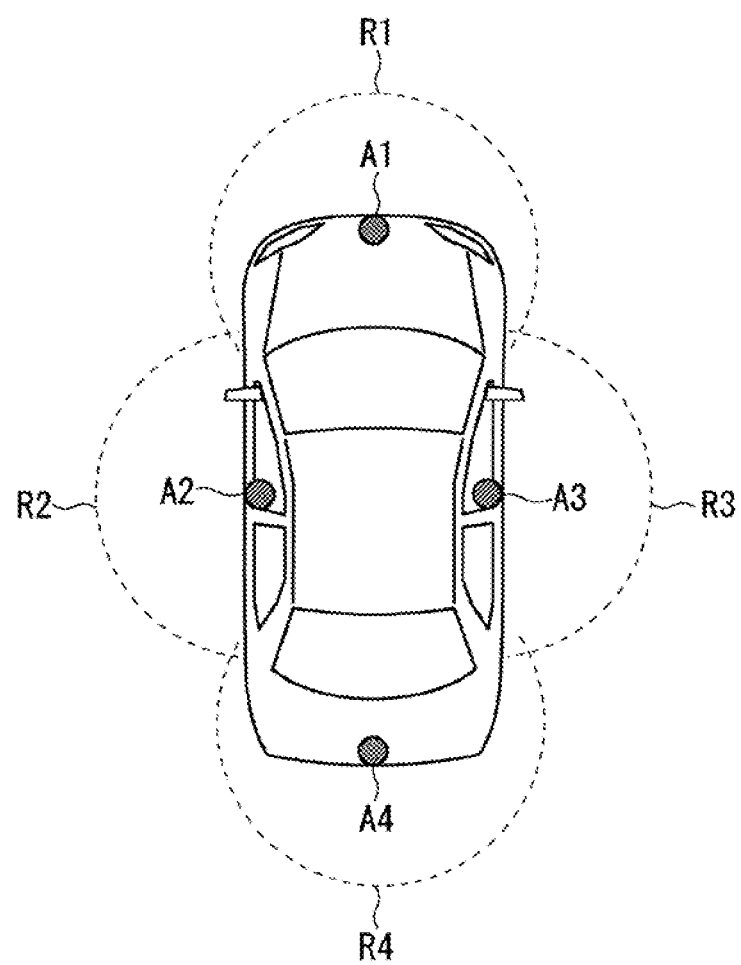
FIG. 3 is a drawing illustrating an example of a location of the antenna of the remote parking device.

In the present embodiment, the remote control receiver 11 receives the remote operation signal using a plurality of antennas, and calculates the relative position of the remote controller (the first remote controller 1 or the second remote controller 2) which has transmitted the signal from the reception condition of each antenna. For example, as illustrated in FIG. 2, when three antennas A1 to A3 having reception areas R1 to R3 overlapping with each other, respectively, are disposed in the subject vehicle, the relative position of the remote controller which has transmitted the signal can be calculated from presence or absence of reception, a reception intensity, and a response time of the remote operation signal in each of the antennas A1 to A3, for example. As illustrated in FIG. 3, when the three antennas A1 to A3 having the reception areas R1 to R3 which hardly overlap with each other, respectively, are disposed in the subject vehicle, the relative position of the remote controller which has transmitted the signal with respect to the subject vehicle can be calculated depending on which of the antennas A1 to A3 has received the remote operation signal. However, a method of calculating the relative position of the remote controller with respect to the subject vehicle and the number and position of antennas receiving the remote operation signal are not limited thereto illustrated in FIG. 2 and FIG. 3. For example, only one antenna may be disposed in a central part of the subject vehicle, or four or more antennas may be disposed in the subject vehicle.

Returning to FIG. 1, the sensor information receiver 12 receives the sensor information including the surrounding information obtained in the surrounding information sensor 3 and the vehicle information obtained in the vehicle information sensor 4, determines which target or white line is located around the subject vehicle, and outputs the result to the remote parking controller 14.

For example, when the surrounding information sensor 3 is made up of the plurality of sensors, there may be a case where a variation occurs in data of target information included in the surrounding information received in the sensor information receiver 12 due to a ranging timing, a gap of timing of data transmission, a ranging error of each sensor, for example, even when there is only one target around the subject vehicle, and the target is detected in a plurality of positions (coordinates). The sensor information receiver 12 organize the target information in consideration of a movement of the subject vehicle recognized from the vehicle information, the ranging timing, the transmission timing, and the ranging error of each sensor, and outputs the organized target information to the remote parking controller 14.

For example, when a plurality of coordinates of the target are detected in positions close to each other, the sensor information receiver 12 determines that they are the coordinates of one target, and adopts the coordinate obtained from the information of the most reliable sensor as the position of the target. Alternatively, an average coordinate of the plurality of coordinates may be considered as the position of the target, or a weighted average coordinate obtained by weighting the plurality of coordinates in accordance with reliability may be considered as the position of the target. The sensor information receiver 12 may estimate a current coordinate of the target based on movements of the subject vehicle and the target and a time difference between the ranging timing and a current time, and output the target information including the estimated current coordinate of the target to the remote parking controller 14.

When the surrounding information sensor 3 is made up of the plurality of sensors, a variation also occurs in information of white line (a position, a curvature, and the number of white lines), thus the sensor information receiver 12 also organizes the white line information by a method similar to the case of organizing the target information and outputs the organized white line information to the remote parking controller 14.

When the remote control receiver 11 receives the plurality of remote operation signals including the remote parking commands at the same time, the priority determination part 13 determines priority of each of the plurality of remote parking commands included in the plurality of remote operation signals based on the information obtained from the plurality of remote operation signals. In the present embodiment, when the remote control receiver 11 receives the remote operation signals including the remote parking commands from both the first remote controller 1 and the second remote controller 2 at the same time, the priority determination part 13 determines which command of the first remote controller 1 and the second remote controller 2 has priority.

A specific example of a priority determination performed by the priority determination part 13 is described hereinafter. In the description hereinafter, "the plurality of remote parking commands included in the remote operation signals which have been received at the same time" is simply referred to as "the plurality of remote parking commands which have been received at the same time" in some cases.

The priority determination part 13 may determine the priority of each remote parking command based on contents of the plurality of remote parking commands included in the remote operation signals which have been received at the same time. Specifically, when the plurality of remote parking commands which have been received at the same time include a parking start command and a parking suspend command, the priority determination part 13 may assign higher priority to the parking suspend command than to the parking start command. For example, when one of the remote parking commands from the first remote controller 1 and the second remote controller 2 is the parking start command and the other one thereof is the parking suspend command, the parking suspend command has priority. The parking suspend command has priority over the parking start command, thus the safety of the subject vehicle can be ensured. However, the parking start command may have priority over the parking suspend command depending on a condition of the subject vehicle.

When the plurality of remote parking commands which have been received at the same time include the loading command and the unloading command, the priority determination part 13 may assign higher priority to the unloading command than to the loading command. For example, when one of the remote parking commands from the first remote controller 1 and the second remote controller 2 is the loading command and the other one thereof is the unloading command, the unloading command has priority. The loading command is to move the subject vehicle in a parking space, and has danger and a risk such as a state where there is an obstacle in the parking space or the parking space is too small to park the subject vehicle, for example, thus the safety of the subject vehicle can be ensured when the unloading command has the higher priority than the loading command. However, the loading command may have priority over the unloading command depending on a condition of the subject vehicle. It is preferable to assign higher priority to the parking suspend command than to the loading command and the unloading command.

The priority determination part 13 may determine the priority of each remote parking command based on types of the plurality of remote controllers which have transmitted the remote operation signals which have been received at the same time. For example, when one of the first remote controller 1 and the second remote controller 2 is a smartphone and the other one thereof is an electronic key, higher priority may be assigned to the remote parking command transmitted from the smartphone than to the remote parking command transmitted from the electronic key. The smartphone can set contents of the remote parking command in more detail than the electronic key, thus the safety of the subject vehicle can be ensured when the higher priority is assigned to the remote parking command transmitted from the smartphone than to the remote parking command transmitted from the electronic key. However, the higher priority may be assigned to the remote parking command transmitted from the electronic key than to the remote parking command transmitted from the smartphone.

The priority determination part 13 may determine the priority of each remote parking command based on a distance from each of the plurality of remote controllers, which have transmitted the remote operation signals which have been received at the same time, to the subject vehicle. Specifically, the priority determination part 13 may assign higher priority to the remote parking command which has been transmitted from a remote controller having a smaller distance from the subject vehicle. An operator of the remote controller located closer to the subject vehicle can have a closeup view of a condition of the subject vehicle and the parking space, thus the safety of the subject vehicle can be ensured when the remote parking command of the remote controller located closer to the subject vehicle has the priority. However, the higher priority may be assigned to the remote parking command transmitted from the remote controller having the larger distance from the subject vehicle depending on a condition of the subject vehicle.

The priority determination part 13 may determine the priority of each remote parking command based on a direction of a position of each of the plurality of remote controllers, which have transmitted the remote operation signals which have been received at the same time, from the subject vehicle. Specifically, the priority determination part 13 may assign higher priority to the remote parking command which has been transmitted from a remote controller located in a position closer to a traveling direction of the subject vehicle. For example, when the first remote controller 1 is located in front of the traveling direction of the subject vehicle and the second remote controller 2 is located in an opposite side of the traveling direction of the subject vehicle, the remote parking command transmitted from the first remote controller 1 has priority. The operator of the remote controller located closer to the traveling direction the subject vehicle can accurately grasp the condition of the subject vehicle and the parking space, thus the safety of the subject vehicle can be ensured when the remote parking command of the remote controller located closer to the traveling direction of the subject vehicle has the priority. However, the higher priority may be assigned to the remote parking command transmitted from the remote controller located farther away from the traveling direction of the subject vehicle depending on a condition of the subject vehicle.

The priority determination part 13 may determine the priority of each remote parking command based on a reception intensity of each of the remote operation signals received at the same time. Specifically, the priority determination part 13 may assign higher priority to the remote parking command included in the remote operation signal having a larger reception intensity. For example, when the reception intensity of the remote operation signal from the first remote controller 1 is larger than that of the remote operation signal from the second remote controller 2, the remote parking command included in the remote operation signal from the first remote controller 1 has priority. The remote operation signal having the small reception intensity has a high possibility of being transmitted from a remote controller located farther away from the subject vehicle, thus the safety of the subject vehicle can be ensured when the remote parking command included in the remote operation signal having the larger reception intensity has the priority. However, the higher priority may be assigned to the remote parking command having the smaller reception intensity depending on a condition of the subject vehicle.

Furthermore, the priority determination part 13 may determine the priority of each remote parking command based on two or more evaluation items described above of: (a) the contents of the plurality of remote parking commands included in the remote operation signals which have been received at the same time; (b) the types of the plurality of remote controllers transmitting the remote operation signals which have been received at the same time; (c) the distance from each of the plurality of remote controllers transmitting the remote operation signals, which have been received at the same time, to the subject vehicle; (d) the direction of the position of each of the plurality of remote controllers transmitting the remote operation signals which have been received at the same time, from the subject vehicle; and (e) the reception intensity of each of the remote operation signals which have been received at the same time.

When the priority determination part 13 determines the priority from the plurality of evaluation items, an evaluation table in FIG. 4 may be used, for example. The evaluation table in FIG. 4 indicates an evaluation score of priority for each of the evaluation items (a) to (e), and the priority determination part 13 can determine the priority of each remote parking command in accordance with a total of the evaluation score on the evaluation items (a) to (e) of each remote parking command based on this evaluation table.

For example, when the first remote controller 1 is an electronic key located in the rear of the subject vehicle at a middle distance and the remote control receiver 11 receives the remote operation signal including the parking suspend command at a small electrical wave intensity from the first remote controller 1, an evaluation score H(1) of the remote parking command is calculated as $H(1)=w_1(1)+w_2(1)+w_3(1)+w_4(1)+w_5(1)=20+3+3+1+1=28$ from the evaluation table in FIG. 4. When the second remote controller 2 is a smartphone located in front of the subject vehicle at a small distance and the remote control receiver 11 receives the remote operation signal including the loading command at a large electrical wave intensity from the second remote controller 2, an evaluation score H(2) of the remote parking command is calculated as $H(2)=w_1(2)+w_2(2)+w_3(2)+w_4(2)+w_5(2)=1+5+5+5+3=19$ from the evaluation table in FIG. 4.

The priority determination part 13 compares the evaluation score H(1) of the remote parking command from the first remote controller 1 and the evaluation score H(2) of the remote parking command from the second remote controller 2, and determines the remote parking command having the higher evaluation score as the remote parking command having the higher priority. The above example indicates H(1)>H(2), thus the remote parking command (the parking suspend command) from the first remote controller 1 is determined to have the higher priority than the remote parking command (the loading command) from the second remote controller 2.

The evaluation table of the priority of the remote parking command is not limited thereto indicated in FIG. 4. In the evaluation table in FIG. 4, the evaluation score of each evaluation item is divided into two or three stages, but may also be divided into more stages. It is expected that a safer remote parking command can be accurately selected in accordance with the evaluation by small classification. The distance and reception intensity from the subject vehicle may be evaluated by a reciprocal number of physical value.

It is also applicable that the priority determination part 13 determines the priority of the remote parking command using an artificial intelligence (AI) technique such as neural network learning the priority (the degree of safety or reliability) of the remote parking command from the data regarding the evaluation items (a) to (e) of the remote parking command instead of using the evaluation table. An AI technique may be used for generating the evaluation table.

Returning to FIG. 1, the remote parking controller 14 controls the actuator 5 based on the remote parking command which is included in the remote operation signal received in the remote control receiver 11 and the sensor information received in the sensor information receiver 12, thereby controlling the remote parking of the subject vehicle. However, when the remote control receiver 11 receives the plurality of remote operation signals including the remote parking commands at the same time, the remote parking controller 14 controls the remote parking of the subject vehicle based on the remote parking command which is determined to have the highest priority by the priority determination part 13 and the sensor information received in the sensor information receiver 12.

The control of the remote parking is performed by the remote parking controller 14 by the following procedure. That is to say, the remote parking controller 14 searches a parking space based on the surrounding information obtained in the surrounding information sensor 3, generates an optimal parking route based on the position and direction of the subject vehicle relative to the detected parking space, and calculates a control command to the actuator 5 to make the subject vehicle travel along the parking route.

Applied as the method of searching the parking space are a method of searching a white line of a parking place using a surrounding monitoring camera of the subject vehicle, thereby searching the parking space and a method of searching a space which does not include a target using a sonar sensor, a millimeter wave radar, and a LIDAR, thereby searching the parking space, for example. Applied as the method of generating the parking route is a method of calculating various routes enabling the parking of the subject vehicle and selecting one route in accordance with a predetermined evaluation index (for example, a shortest route, a route with a small steering amount, and a route having a sufficient distance from an obstacle) from the various routes.

The actuator 5 controlled by the remote parking controller 14 in the remote parking is mainly an engine, a brake, or a steering unit, for example, and a shift lever, a parking brake, a hazard lamp, a door mirror may also be subject to be controlled by the remote parking controller 14. Human machine interface (HMI) such as a display device and a speaker may be included in an object to be controlled by the remote parking controller 14.

FIG. 1 illustrates the configuration that the remote parking command is input from the remote control receiver 11 to the remote parking controller 14 and the priority of the remote parking command is input from the priority determination part 13, however, also applicable is a configuration that the priority determination part 13 selects the remote parking command having the highest priority from the remote parking commands which have been received at the same time, and input only the selected the remote parking command to the remote parking controller 14.

Figure 5:
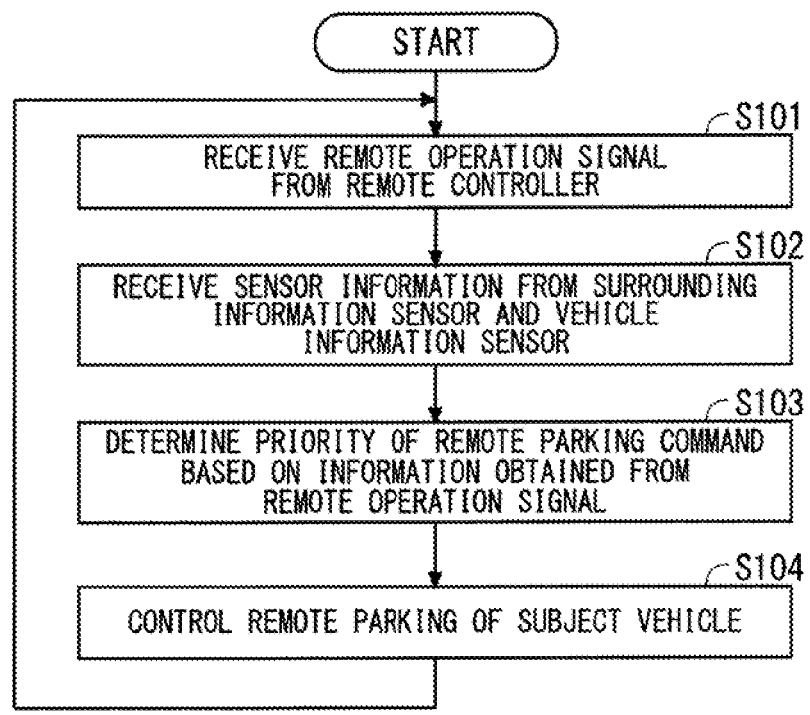
FIG. 5 is a flow chart explaining an operation of the remote parking device according to the embodiment 1 of the present invention.

Next, an operation of the remote parking device 10 according to the embodiment 1 is described with reference to a flow chart illustrated in FIG. 5.

The remote parking device 10 is activated when a driver makes the subject vehicle enter a self-parking mode. When the remote parking device 10 is activated, the remote control receiver 11 firstly receives the remote operation signal including the remote parking command of the subject vehicle from the remote controller (the first remote controller 1 or the second remote controller 2) (Step S101). The sensor information receiver 12 receives the sensor information including the surrounding information obtained in the surrounding information sensor 3 and the vehicle information obtained in the vehicle information sensor 4 (Step S102). Then, the priority determination part 13 determines the priority of the remote parking command included in the remote operation signal based on the information obtained from the remote operation signal received in the remote control receiver 11 (Step S103).

Subsequently, the remote parking controller 14 controls the remote parking of the subject vehicle based on the remote parking command received in the remote control receiver 11 and the sensor information received in the sensor information receiver 12 (Step S104). However, when the remote control receiver 11 receives the remote operation signals including the remote parking commands from the plurality of remote controller at the same time, the remote parking controller 14 controls the remote parking of the subject vehicle based on the remote parking command having the highest priority in the plurality of remote parking commands included in the remote operation signals and the sensor information in Step S104. The remote parking device 10 executes the above operation repeatedly.

In the above description, the remote parking controller 14 selects the remote parking command having the highest priority from the remote parking commands which have been received at the same time, however, it is also applicable that the priority determination part 13 selects the remote parking command and inputs only the remote parking command having the highest priority in the remote parking commands which have been received at the same time to the remote parking controller 14.

Embodiment 2

Figure 6:
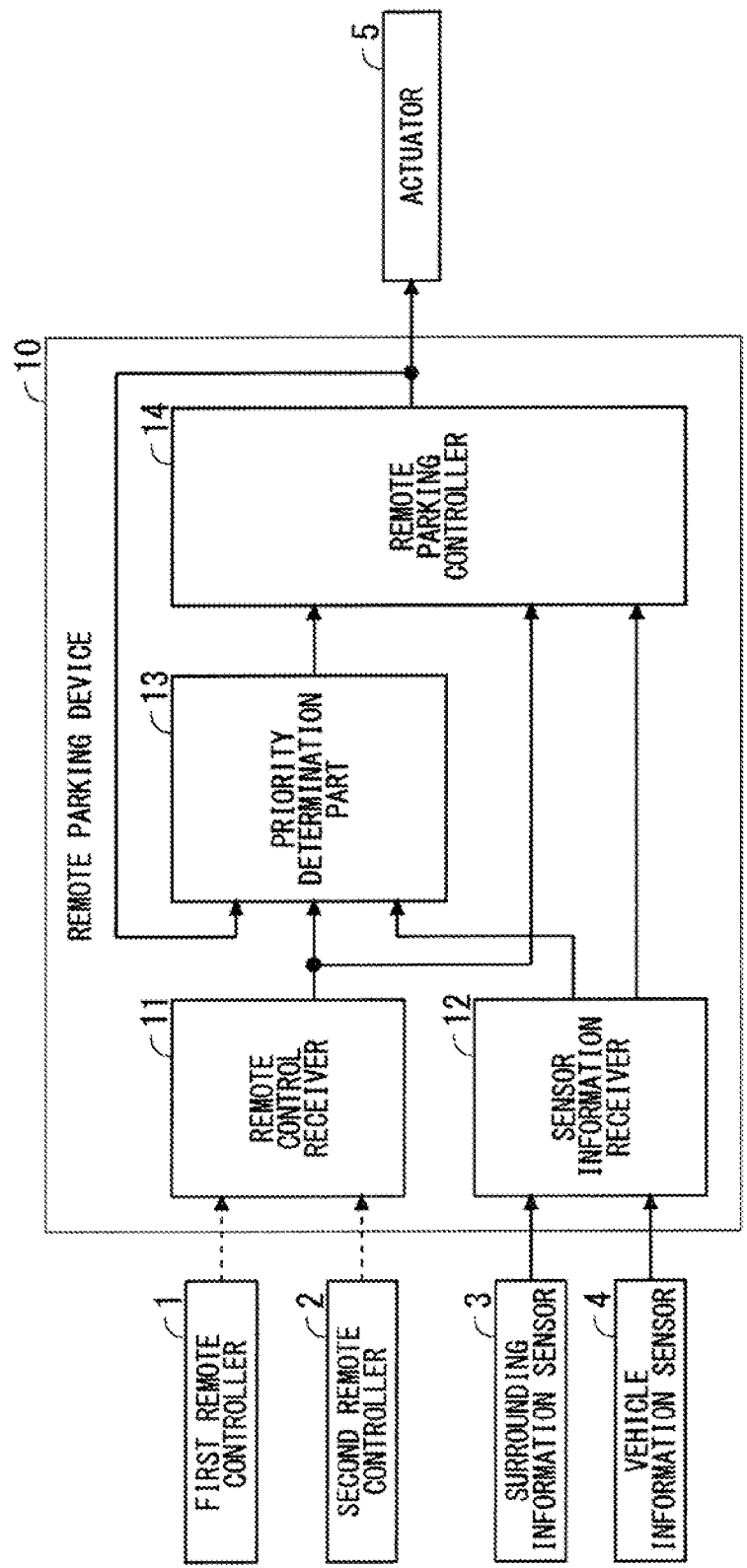
FIG. 6 is a block diagram illustrating a configuration of a remote parking device according to an embodiment 2 of the present invention.

FIG. 6 is a block diagram illustrating a configuration of the remote parking device 10 according to an embodiment 2.

The remote parking device 10 in FIG. 6 is different from that in FIG. 1 in that not only the output from the remote control receiver 11 but also the outputs from the sensor information receiver 12 and the remote parking controller 14 are input to the priority determination part 13.

The priority determination part 13 in the embodiment 2 determines the priority of each remote parking command in consideration of not only the information obtained from the remote operation signal received in the remote control receiver 11 but also the sensor information received in the sensor information receiver 12 and the output from the remote parking controller 14. The operations of the constituent elements other than the priority determination part 13 are similar to those in the embodiment 1, thus the description thereof is omitted herein.

A specific example of a priority determination performed by the priority determination part 13 in the embodiment 2 is described hereinafter.

The priority determination part 13 can confirm whether the position of the remote controller recognized by the remote control receiver 11 is correct based on the surrounding information received in the sensor information receiver 12. For example, when the remote control receiver 11 recognizes that the remote operation signal has been received from the remote controller in front of the subject vehicle, the priority determination part 13 confirms whether there is a person or an obstacle in front of the subject vehicle based on the surrounding information. At this time, when there is no person or obstacle in front of the subject vehicle, there is a possibility that the remote control receiver 11 erroneously recognize the remote operation signal or the remote operation signal is transmitted from an invalid remote controller, thus the priority determination part 13 may determine the priority of the remote parking command included in the remote operation signal to be lowest (or may ignore the remote parking command).

When there are a small number of antennas for receiving the remote operation signal of the remote control receiver 11, there may be a case where the remote control receiver 11 can recognize a distance from the remote controller to the subject vehicle and the reception intensity but cannot recognize a direction of the remote controller. In such a case, the priority determination part 13 may detect a person or an obstacle around the subject vehicle based on the surrounding information and recognize the direction in which the remote controller is located.

In this manner, the priority determination part 13 takes the sensor information from the sensor information receiver 12 into consideration, thus the reliability of the priority determination of the remote parking command can be increased.

When an actual acceleration measured in the vehicle information sensor 4 has a large value even though the remote parking controller 14 transmits a command of slight speed-up to the actuator 5, the priority determination part 13 may set a higher priority on a switch command to switch to a low speed mode than usual. For example, it is considered that the speed of the subject vehicle increases more than the command of the remote parking controller 14 in a case of parking the subject vehicle midway in a slope, and in such a case, the priority of the switch command to switch to the low speed mode increases, thus the safety of the subject vehicle can be ensured.

It is also applicable that an item regarding the sensor information and the output from the remote parking controller 14 is added to the evaluation item of the evaluation table of the priority illustrated in FIG. 4, and the priority determination part 13 determines the priority of the remote parking command based on the plurality of evaluation items including those items. It is also applicable to determine the priority of the remote parking command using an artificial intelligence (AI) technique such as neural network learning the priority (the degree of safety or reliability) of the remote parking command from the data regarding the plurality of evaluation items including the items regarding the sensor information and the output from the remote parking controller 14. An AI technique may be used for generating the evaluation table.

Figure 7:
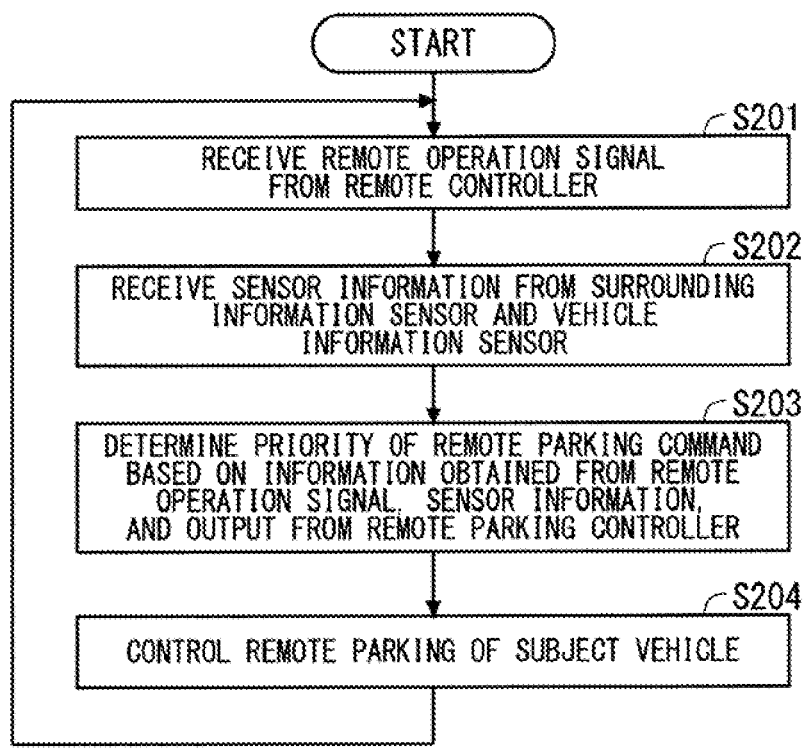
FIG. 7 is a flow chart explaining an operation of the remote parking device according to the embodiment 2 of the present invention.

Next, an operation of the remote parking device 10 according to the embodiment 2 is described with reference to a flow chart illustrated in FIG. 7.

The remote parking device 10 is activated when a driver makes the subject vehicle enter a self-parking mode. When the remote parking device 10 is activated, the remote control receiver 11 firstly receives the remote operation signal including the remote parking command of the subject vehicle from the remote controller (the first remote controller 1 or the second remote controller 2) (Step S201). The sensor information receiver 12 receives the sensor information including the surrounding information obtained in the surrounding information sensor 3 and the vehicle information obtained in the vehicle information sensor 4 (Step S202). Then, the priority determination part 13 determines the priority of the remote parking command included in the remote operation signal based on the information obtained from the received remote operation signal, the sensor information, and the output from the remote parking controller 14 (Step S203). Herein, a value initially input from the remote parking controller 14 to the priority determination part 13 is a predetermined initial value.

Subsequently, the remote parking controller 14 controls the remote parking of the subject vehicle based on the remote parking command received in the remote control receiver 11 and the sensor information received in the sensor information receiver 12 (Step S204). However, when the remote control receiver 11 receives the remote operation signals including the remote parking commands from the plurality of remote controller at the same time, the remote parking controller 14 controls the remote parking of the subject vehicle based on the remote parking command having the highest priority in the plurality of remote parking commands included in the remote operation signals and the sensor information in Step S204. The remote parking device 10 executes the above operation repeatedly.

Described in the present embodiment is the example that the priority determination part 13 takes both the sensor information received in the sensor information receiver 12 and the output from the remote parking controller 14 into consideration for the determination of the priority of the remote parking command, however, either one of them may also be taken into consideration.

Example of Hardware Configuration

FIG. 8 and FIG. 8 are drawings each illustrating an example of a hardware configuration of the remote parking device 10. Each function of the constituent elements in the remote parking device 10 illustrated in FIG. 1 or FIG. 6 is achieved by a processing circuit 50 illustrated in FIG. 8, for example. That is to say, the remote parking device 10 includes the processing circuit 50 for receiving the remote operation signals including the remote parking commands of the subject vehicle from the plurality of remote controllers, receiving the sensor information including the surrounding information obtained in the surrounding information sensor 3 in the subject vehicle and the vehicle information obtained in the vehicle information sensor 4 in the subject vehicle, and controlling the remote parking of the subject vehicle based on the remote parking command and the sensor information. When the plurality of remote operation signals including the remote parking commands are received at the same time, the processing circuit 50 determines the priority of each of the plurality of remote parking commands included in the plurality of remote operation signals based on the information obtained from the plurality of remote operation signals, and controls the remote parking of the subject vehicle based on the remote parking command having the highest priority in the plurality of the remote parking commands included in the plurality of the remote operation signals and the sensor information. The processing circuit 50 may be dedicated hardware or may also be made up using a processer (also referred to as a central processing unit (CPU), a processing device, an arithmetic device, a microprocessor, a microcomputer, or a digital signal processor (DSP)) executing a program stored in a memory.

When the processing circuit 50 is the dedicated hardware, a single circuit, a complex circuit, a programmed processor, a parallel-programmed processor, an application specific integrated circuit (ASIC), a field-programmable gate array (FPGA), or a combination of them, for example, falls under the processing circuit 50. Each function of the constituent elements in the remote parking device 10 may be achieved by an individual processing circuit, or each function of them may also be collectively achieved by one processing circuit.

FIG. 9 illustrates an example of the hardware configuration of the remote parking device 10 in a case where the processing circuit 50 is made up using a processor 51 executing a program. In this case, the functions of the constituent elements of the remote parking device 10 are achieved by software etc. (software, firmware, or a combination of software and firmware). The software etc. is described as a program and is stored in a memory 52. The processor 51 reads out and executes a program stored in the memory 52, thereby achieving the function of each unit. That is to say, the remote parking device 10 includes the memory 52 to store the program to resultingly execute, at a time of being executed by the processing circuit 51, processes of: receiving the remote operation signals including the remote parking commands of the subject vehicle from the plurality of remote controllers; receiving the sensor information including the surrounding information obtained in the surrounding information sensor 3 in the subject vehicle and the vehicle information obtained in the vehicle information sensor 4 in the subject vehicle; and controlling the remote parking of the subject vehicle based on the remote parking command and the sensor information. When the plurality of remote operation signals including the remote parking commands are received at the same time, the processing circuit 51 executing the program determines the priority of each of the plurality of remote parking commands included in the plurality of remote operation signals based on the information obtained from the plurality of remote operation signals, and controls the remote parking of the subject vehicle based on the remote parking command having the highest priority in the plurality of remote parking commands included in the plurality of the remote operation signals and the sensor information. In other words, this program is also deemed to make a computer execute a procedure or a method of the operation of the constituent elements of the remote parking device 10.

Herein, the memory 52 may be a non-volatile or volatile semiconductor memory such as a RAM (Random Access Memory), a ROM (Read Only Memory), a flash memory, an EPROM (Electrically Programmable Read Only Memory), or an EEPROM (Electrically Erasable Programmable Read Only Memory), an HDD (Hard Disk Drive), a magnetic disc, a flexible disc, an optical disc, a compact disc, a mini disc, a DVD (Digital Versatile Disc), or a drive device of them, or any storage medium which is to be used in the future, for example.

Described above is the configuration that each function of the constituent elements of the remote parking device 10 is achieved by one of the hardware and the software, for example. However, the configuration is not limited thereto, but also applicable is a configuration of achieving a part of the constituent elements of the remote parking device 10 by dedicated hardware and achieving another part of them by software, for example. For example, the function of the part of the constituent elements can be achieved by the processing circuit 50 as the dedicated hardware, for example, and the function of the other part of the constituent elements can be achieved by the processing circuit 50 as the processor 51 reading out and executing the program stored in the memory 52.

As described above, the remote parking device 10 can achieve each function described above by the hardware, the software, or the combination of them, for example.

According to the present invention, each embodiment can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A remote parking device, comprising:
a processor to execute a program; and
a memory to store the program which, when executed by the processor, performs processes of,
receiving at least one remote operation signal including at least one remote parking command of a subject vehicle from a plurality of remote controllers;
receiving sensor information including surrounding information obtained in a surrounding information sensor in the subject vehicle and vehicle information obtained in a vehicle information sensor in the subject vehicle;
controlling a remote parking of the subject vehicle based on the remote parking command and the sensor information; and
when the plurality of remote operation signals including the remote parking commands are simultaneously received, determining priority of each of the plurality of remote parking commands included in the plurality of remote operation signals based on information obtained from the plurality of remote operation signals, and controlling the remote parking of the subject vehicle based on the remote parking command having highest priority and the sensor information, wherein
the processor determines priority of each of the remote parking commands based on one or more items of:
(a) whether the plurality of remote parking commands included in the remote operation signals which have been simultaneously received include a parking start command and a parking suspend command;
(b) whether the plurality of remote parking commands included in the remote operation signals which have been simultaneously received include a loading command and an unloading command;

(c) types of the plurality of remote controllers transmitting the remote operation signals which have been simultaneously received;
(d) a distance from each of the plurality of remote controllers transmitting the remote operation signals, which have been simultaneously received, to the subject vehicle;
(e) a direction of the position of each of the plurality of remote controllers transmitting the remote operation signals, which have been simultaneously received, from the subject vehicle; and
(f) a reception intensity of each of the remote operation signals which have been simultaneously received.

2. The remote parking device according to claim 1, wherein
when the plurality of remote parking commands included in the remote operation signals which have been simultaneously received include a parking start command and a parking suspend command, the processor assigns higher priority to the parking suspend command than to the parking start command.

3. The remote parking device according to claim 1, wherein
when the plurality of remote parking commands included in the remote operation signals which have been simultaneously received include a loading command and an unloading command, the processor assigns higher priority to the unloading command than to the loading command.

4. The remote parking device according to claim 1, wherein
the processor determines priority of each of the remote parking commands based on types of the plurality of remote controllers transmitting the remote operation signals which have been simultaneously received.

5. The remote parking device according to claim 4, wherein
when the plurality of remote controllers transmitting the remote operation signals which have been simultaneously received include an electronic key and a smartphone, the processor assigns higher priority to the remote parking command transmitted from the smartphone than to the remote parking command transmitted from the electronic key.

6. The remote parking device according to claim 1, wherein
the processor determines priority of each of the remote parking commands based on a distance from each of the plurality of remote controllers transmitting the remote operation signals, which have been simultaneously received, to the subject vehicle.

7. The remote parking device according to claim 6, wherein
the processor assigns higher priority to a remote parking command which has been transmitted from one of the plurality of remote controllers having a smaller distance from the subject vehicle than the other one of the plurality of remote controllers.

8. The remote parking device according to claim 1, wherein
the processor determines priority of each of the remote parking commands based on a direction of a position of each of the plurality of remote controllers transmitting the remote operation signals, which have been simultaneously received, from the subject vehicle.

9. The remote parking device according to claim 8, wherein
the processor assigns higher priority to a remote parking command transmitted from one of the plurality of remote controllers located in a direction from the subject vehicle closer to a traveling direction of the subject vehicle than the other one of the plurality of remote controllers.

10. The remote parking device according to claim 1, wherein
the processor determines priority of each of the remote parking commands based on a reception intensity of each of the remote operation signals which have been simultaneously received.

11. The remote parking device according to claim 10, wherein
the processor assigns higher priority to a remote parking command included in the remote operation signal having a larger reception intensity than the other remote operation signal.

12. The remote parking device according to claim 1, wherein
the processor determines priority of each of the remote parking commands based on two or more items of:
(a) contents of the plurality of remote parking commands included in the remote operation signals which have been simultaneously received;
(b) types of the plurality of remote controllers transmitting the remote operation signals which have been simultaneously received;
(c) a distance from each of the plurality of remote controllers transmitting the remote operation signals, which have been simultaneously received, to the subject vehicle;
(d) a direction of the position of each of the plurality of remote controllers transmitting the remote operation signals, which have been simultaneously received, from the subject vehicle; and
(e) a reception intensity of each of the remote operation signals which have been simultaneously received.

13. The remote parking device according to claim 12, wherein
the processor determines priority of each of the remote parking commands based on an evaluation table evaluating priority from two or more items of:
(a) contents of the plurality of remote parking commands included in the remote operation signals which have been simultaneously received;
(b) types of the plurality of remote controllers transmitting the remote operation signals which have been simultaneously received;
(c) a distance from each of the plurality of remote controllers transmitting the remote operation signals, which have been simultaneously received, to the subject vehicle;
(d) a direction of the position of each of the plurality of remote controllers transmitting the remote operation signals, which have been simultaneously received, from the subject vehicle; and
(e) a reception intensity of each of the remote operation signals which have been simultaneously received.

14. The remote parking device according to claim 12, wherein
the processor determines priority of each of the remote parking commands using an artificial intelligence from two or more items of:
(a) contents of the plurality of remote parking commands included in the remote operation signals which have been simultaneously received;

(b) types of the plurality of remote controllers transmitting the remote operation signals which have been simultaneously received;
(c) a distance from each of the plurality of remote controllers transmitting the remote operation signals, which have been simultaneously received, to the subject vehicle;
(d) a direction of the position of each of the plurality of remote controllers transmitting the remote operation signals, which have been simultaneously received, from the subject vehicle; and
(e) a reception intensity of each of the remote operation signals which have been simultaneously received.

15. The remote parking device according to claim 12, wherein
the processor determines priority of each of the remote parking commands in consideration of the sensor information.

16. The remote parking device according to claim 12, wherein
the processor determines priority of each of the remote parking commands in consideration of contents of control in the remote parking of the subject vehicle.

17. A remote parking method, comprising:
receiving at least one remote operation signal including at least one remote parking command of a subject vehicle from a plurality of remote controllers;
receiving sensor information including surrounding information obtained in a surrounding information sensor in the subject vehicle and vehicle information obtained in a vehicle information sensor in the subject vehicle;
controlling a remote parking of the subject vehicle based on the remote parking command and the sensor information; and when the plurality of remote operation signals including the remote parking commands are simultaneously received, determining priority of each of the plurality of remote parking commands included in the plurality of remote operation signals based on information obtained from the plurality of remote operation signals, and controlling the remote parking of the subject vehicle based on the remote parking command having highest priority and the sensor information, where
priority of each of the remote parking commands is determined based on one or more items of:
(a) whether the plurality of remote parking commands included in the remote operation signals which have been simultaneously received include a parking start command and a parking suspend command;
(b) whether the plurality of remote parking commands included in the remote operation signals which have been simultaneously received include a loading command and an unloading command;
(c) types of the plurality of remote controllers transmitting the remote operation signals which have been simultaneously received;
(d) a distance from each of the plurality of remote controllers transmitting the remote operation signals, which have been simultaneously received, to the subject vehicle;
(e) a direction of the position of each of the plurality of remote controllers transmitting the remote operation signals, which have been simultaneously received, from the subject vehicle; and
(f) a reception intensity of each of the remote operation signals which have been simultaneously received.

\* \* \* \* \*